United States Patent Office 3,359,229
Patented Dec. 19, 1967

3,359,229
VULCANIZABLE RUBBER COMPOSITIONS
Paul Chalex, Elmhurst, William R. Dunlop, Maywood, and Selwyn R. Mather, Elmhurst, Ill., assignors to The Richardson Company, Melrose Park, Ill.
No Drawing. Filed Feb. 26, 1964, Ser. No. 347,380
9 Claims. (Cl. 260—33.6)

ABSTRACT OF THE DISCLOSURE

Vulcanizable rubber compositions characterized by a sulfur-vulcanizable elastomer, bituminous coal, a processing oil, sulfur, an accelerator, and relatively large amounts of alkaline earth hydroxides and oxides.

---

The present invention is concerned with new and improved vulcanizable hard rubber compositions and, particularly, rubber compositions containing coal particles as a filler.

In describing the details of the present invention reference will generally be made to battery parts and, particularly, to the multicell automotive battery containers and covers due to the fact that presently the majority of such articles are customarily molded from vulcanizable rubber compositions.

Rubber battery containers are normally molded from a vulcanizable composition containing rubber as a binder, a vulcanizing agent such as sulfur, selected accelerators, other processing aids including oils, and up to about 80 percent of a filler. Typical fillers used are hard rubber dust and coal dust. Hard rubber dust fillers are primarily employed in the premium grade molded rubber battery containers, whereas coal dust fillers are normally used with the standard commercial grade battery container which comprises the predominate market.

In general, the principal coal dust filler for rubber compositions has been derived from anthracite coal for several reasons. First, anthracite coal is harder than bituminous coal and contains little, if any, volatile matter. Generally, any appreciable volatile matter in a filler was usually considered undesirable due to a tendency of the volatile to create gases when a composition containing the same was subjected to heat in a molding operation. Also, explosive hazards are present to a greater extent when grinding bituminous coal to obtain a desired particle size as compared to anthracite coal. Additionally, anthracite coal is generally considered to be more chemically inert than bituminous coal, and, hence, less likely to materially change the chemical characteristics of a molding composition. Further, and perhaps equally important, compositions containing bituminous coal have usually produced articles inclined to be soft or mushy rather than firm or hard, as in the case with compositions containing anthracite coal. Also, bituminous coal dust has generally been considered difficult to disperse in a rubber composition, resulting in non-uniform properties of a product molded from such a composition unless great care and prolonged mixing were employed.

A particular disadvantage in using anthracite coal is that such coal is normally only obtainable from the Appalachian area in the general vicinity of eastern Pennsylvania. Such a limited or localized source creates problems of availability and expenses in shipping. On the other hand, bituminous coal is more widely available throughout the United States and, hence, its use would offer considerable advantage over anthracite.

Accordingly, it is the primary object of this invention to provide rubber molding compositions containing a relatively large percent of finely divided bituminous coal as a filler.

Another object is to provide articles molded from bituminous coal-containing compositions of the foregoing type having properties at least equal to and frequently better than articles molded from rubber compositions containing anthracite coal.

The foregoing and other objects are achieved by improved processing steps, the use of certain compounding ingredients within specified amounts and maintaining the particle size of the bituminous coal within a predeterminded range. Further, it has been found that enhanced properties can be attained in rubber molding compositions using bituminous coal as a filler rather than anthracite if the composition is compounded with appreciable quantities of an alkaline earth oxide or hydroxide, particularly calcium hydroxide.

Calicum hydroxide, and similar alkaline earth hydroxides, have heretofore been employed in rubber compositions as an inorganic accelerator. However, such an agent is normally incorporated in a maximum amount of up to about 40 parts per 100 parts of rubber. It has now been found that the objects of the present invention can be achieved if the alkaline earth oxides or hydroxides are employed in an amount of between 80 to 160 parts per 100 parts of rubber with a preferred range of about 110 to 130 parts per 100 parts of rubber. The effect of using such large quantities of alkaline earth hydroxides is not fully understood. It is believed that this class of compound serves to some extent as a wetting agent whereby, together with the particular coal particle sizes specified below, an increased affinity is apparently created between the coal particles, the rubber, vulcanizing agent and the customary oil extender or processing aid. This theory is further supported by the fact that, in the absence of an alkaline earth hydroxide in the properties specified, rubber compositions containing bituminous coal as a filler require relatively long periods for mixing to achieve even a limited amount of dispersion of the components. Additionally, the resulting compositions have less than desired mold flow and involve extended cure times. The latter defect is characteristic of poor dispersion, particularly of the sulfur vulcanizing agent and oil.

It has also been found that the required dispersion and intimate mixing of the bituminous coal, rubber and other components can best be accomplished by use of a coal particle size wherein substantially 100 percent of the particles pass through a 100 mesh screen and at least 50 percent of the particles pass through a 325 mesh screen and, preferably, at least 70 percent of the particles pass through a 325 mesh screen. If coal particle sizes larger than those specified are used, it will be found that the coal filler cannot be dispersed homogeneously and the resulting properties of a molded product are considerably below those usually required and attainable, particularly properties such as impact resistance, tensile strength and the like.

It will be appreciated that various types of coals may be broadly classified as bituminous; however, for purposes of this invention, the bituminous coals contemplated are those classified as bituminous in Table 1 on page 3 of the Bureau of Mines publication entitled "Analyses of Tipple and Delivered Samples of Coal" dated April 1956. In the interest of completeness, the bituminous class contemplated herein from Table 1 is reproduced below:

| Group | Limits of fixed carbon or B.t.u., mineral-matter-free basis | Requisite physical properties |
|---|---|---|
| (1) Low-volatile bituminous coal. | Dry FC, 78 percent or more and less than 86 percent (dry VM, 22 percent or less and more than 14 percent). | |
| (2) Medium-volatile bituminous coal. | Dry FC, 69 percent or more and less than 78 percent (dry VM, 31 percent or less and more than 22 percent). | |
| (3) High-volatile A bituminous coal. | Dry FC, less than 69 percent (dry VM, more than 31 percent); and moist B.t.u., 14,000 or more. | |
| (4) High-volatile B bituminous coal. | Moist B.t.u., 13,000 or more and less than 14,000. | |
| (5) High-volatile C bituminous coal. | Moist B.t.u., 11,000 or more and less than 13,000. | Either agglomerating or non-weathering. |

In the foregoing table.—FC=Fixed carbon; VM=Volatile matter; B.t.u.=British thermal units. Moist B.t.u. refers to coal containing its natural bed moisture but not including visible water on the surface of the coal.

Of the above types of coal, the presently preferred types are the high-volatile A and B bituminous coal (Groups 3 and 4).

The rubber binders applicable to the present invention are those which are primarily sulfur-vulcanizable and preferably have a Mooney viscosity within the range of 20–50. Exemplary rubber elastomers within this class are natural rubber and the SBR type or styrene butadiene copolymers wherein the styrene comprises between 10–30 percent of the copolymer as well as any of the new polybutadienes. Various quantities of the rubber binder may be used depending upon properties required in a particular end product and costs. The rubber may vary from as little as about 8 percent of the total composition up to about 30 percent. For storage battery parts, and particularly storage battery containers, molding compositions of the type contemplated by this invention can be used wherein the rubber comprises between approximately 10–20 percent by weight of the composition and the bituminous coal between 75–50 percent with the remainder comprising the usual rubber compounding ingredients.

In general, molded products made from compositions of the type contemplated herein will be of the hard rubber variety. Accordingly, sulfur, which is normally used as the vulcanizing agent for the rubber binder, should be present within the range of between about 15–30 percent based on the weight of the rubber, and preferably, between approximately 15–25 percent. An accelerator is also normally employed in an amount of between 0.5 to 40 parts per 100 parts of rubber. In general, aldehyde-amine type accelerating agents are preferred, such as dihydropyridine.

A further important component customarily used in preparing or compounding rubber compositions contemplated is a processing oil. Such an oil is generally employed within the range of between 40–70 percent, based on the weight of the rubber. Exemplary property ranges for such an oil are as follows:

| | |
|---|---|
| Specific gravity | 0.900–1.00 |
| Viscosity (SUS at 210° F.) | 53–145 |
| Aniline point, ° F. | 90–220 |

Further, the oils should be substantially free of asphaltenes and be composed for the most part of nitrogen bases, 1st and 2nd acidaffins and saturate components. Exemplary commercially available oils are Dutrex 1786, Circosol 2XH and Shellflex 310.

Oils of the foregoing type assist in fluidizing the components to some extent, serve as lubricants between components and materially aid in obtaining a uniform dispersion of the components throughout the composition.

In compounding the various components, a certain sequence of addition of the components is frequently preferred, although the actual sequence may depend on the amount and type of component as well as the particular mixing equipment used. In general, a Banbury mixer is contemplated, as distinguished from a regular rubber mill. With such an apparatus it has been found desirable to initially mix the rubber binder, oil, other components and a small part of the coal dust for a short period, followed by adding the remainder of the coal dust. After an appropriate period of from about 3–5 minutes the Banbury mix is "dropped" or discharged and may be further mill blended, if desired. The sheets obtained from such a mill may then be comminuted into a fine crumb stock or cut into smaller slabs for molding purposes. One type of system which may be used for preparing a crumb stock for molding purposes from compositions of the type contemplated is disclosed in the Bateman et al. Patent 2,844,327.

In some instances the presence of bituminous coal may tend to produce slower cure times of the rubber compositions when subjected to a molding operation. An increase in cure time may be obtained without detriment to the composition by adding clay and, particularly, clays characterized by a high hydrated aluminum silicate content, a specific gravity of between 2–2.7 and a maximum particle size of approximately one micron. In general, such clays may be added up to about ten percent of the total weight of the composition and preferably between 6–10 percent when required. When the clay is added it normally replaces a part of the bituminous coal.

The following is an exemplary formulation of a rubber-bituminous coal composition which may be used in making molded articles such as battery cases:

| | Lbs. |
|---|---|
| SBR 1511 (butadiene-styrene copolymer containing 23.5% styrene) | 45 |
| Bituminous Coal Dust (100% through 100 mesh, 70% through 325 mesh) | 330 |
| CS 650 microcrystalline wax | 1 |
| Crude aliphatic amine | 1.75 |
| Accelerator (aliphatic aldehyde-aromatic amine condensation product) | .84 |
| Sulfur | 9.0 |
| W2 Oil (Extract of Lube oil) | 31 |
| Lime (powdered) | 54 |

In compounding the foregoing into an appropriate molding composition, all of the non-filler ingredients together with about 15 percent of the coal dust are initially introduced into a Banbury mixer and interdispersed for about two minutes. An additional 15 percent of the coal dust is then usually added and subjected to the mixing action for approximately a half to three quarters of a minute. Finally, the remaining coal dust is added and, after the temperature of the mass has risen to between about 200° to 230° F., the mass is discharged. As disclosed in the aforementioned patent to Bateman et al., the discharged mass may be subjected to further work on a mill and then comminuted for molding as a crumb stock.

Stocks prepared as described above are normally molded in heated molds at temperatures of about 350° to 400° F. for a period of 3 to 5 minutes, whereby vulcanization occurs and the composition is cured to a permanent shape.

As indicated, the present compositions have particular utility in manufacturing a variety of molded articles such as tote boxes and multicell battery containers, many of which are currently made from compositions containing anthracite coal as a filler. Such compositions may be formed in the manner contemplated herein, having a relatively large amount of filler combined with a small quantity of rubber binder.

Articles molded from the present bituminous coal compositions will be found in many instances to have improved properties over corresponding articles made from anthracite-containing compositions, particularly impact resistance. For example, 3 x 2 inch test slabs 0.200 inches thick molded from bituminous coal compositions containing about 10 percent rubber as a binder, when suspended across a 2½ inch wide opening and subjected to the weight of a two pound ball dropped from successively higher altitudes, will demonstrate an impact resistance of between 9–20 inch pounds before cracking. Similar slabs molded from analogous compositions wherein anthracite coal constitutes the filler will usually have an impact resistance in the 5–8 inch pound range. Accordingly, thinner walled battery containers may be made from bituminous-containing rubber compositions, enabling a larger battery capacity for the same outside dimensions.

We claim:

1. A vulcanizable composition comprising from 8–30 percent of a sulfur-vulcanizable, unsaturated-hydrocarbon elastomer, from 75–50 percent of a finely divided bituminous coal wherein substantially all of the coal particles will pass through a 100 mesh screen and at least 50 percent of the coal particles will pass through a 325 mesh screen, between about 80 to 160 parts of a calcium hydroxide or oxide per 100 parts of elastomer between about 40–70 percent of a processing oil based on the weight of the elastomer, between about 0.5 to 40 parts of an accelerator per 100 parts of the elastomer, and between approximately 15–30 percent sulfur based on the weight of the elastomer, the processing oil being further characterized by a specific gravity range of about 0.900–1.00, a viscosity (SUS at 210° F.) range of about 53–145, and an aniline point (° F.) range of about 90–220; and being composed primarily of nitrogen bases, first and second acidaffins, and saturate components; and being substantially free of asphaltenes.

2. A composition as described in claim 1 wherein the sulfur-vulcanizable elastomer is a copolymer of butadiene and styrene.

3. A composition as described in claim 2 wherein a minor part of the bituminous coal is replaced with a clay comprising primarily a hydrated aluminum silicate.

4. A vulcanizable composition as described in claim 1 and which contains from about 10–20 percent of a sulfur-vulcanizable elastomer, from 75–50 percent of a finely divided bituminous coal wherein substantially all of the coal particles will pass through a 100 mesh screen and at least 70 percent of the coal particles will pass through a 325 mesh screen, between about 110 to 130 parts of a calcium hydroxide or oxide per 100 parts of elastomer and between approximately 15–25 percent sulfur based on the weight of the elastomer.

5. A composition as described in claim 4 wherein the sulfur-vulcanizable elastomer is a copolymer of butadiene and styrene.

6. A composition as described in claim 5 wherein the accelerator is an aldehyde-amine.

7. The product resulting from the vulcanization of the composition of claim 1 in a heated mold.

8. The product resulting from the vulcanization of the composition of claim 3 in a heated mold.

9. In a process of forming a vulcanizable elastomeric molding composition containing from about 75–50 percent of a finely divided bituminous coal and about 8–30 percent of a sulfur-vulcanizable, unsaturated-hydrocarbon elastomer, between about 40–70 percent of a processing oil based on the weight of the elastomer, between about 0.5 to 40 parts of an accelerator per 100 parts of the elastomer, and approximately 15–30 percent sulfur based on the weight of elastomer, the processing oil being further characterized by a specific gravity range of about 0.900–1.00, a viscosity (SUS at 210° F.) range of about 53–145, and an aniline point (° F.) range of about 90–220; and which process comprises compounding the components of said composition with from 80 to 160 parts of a calcium hydroxide or oxide per 100 parts of the elastomer.

References Cited

UNITED STATES PATENTS

| 42,257 | 4/1864 | Lundgren | 106—307 |
| 3,093,515 | 6/1963 | Rector | 136—166 |

FOREIGN PATENTS

| 409,891 | 5/1934 | Great Britain. |

ALLAN LIEBERMAN, *Primary Examiner.*